United States Patent [19]
Suhr et al.

[11] 3,809,987
[45] May 7, 1974

[54] AUTOMATIC CENTERING OF OBJECTS IN NON-DESTRUCTIVE TEST APPARATUS

[75] Inventors: Peter J. Suhr, Garden City; Edward D. Spierer, Belle Harbor; Girish P. Mhatre, Mount Vernon, all of N.Y.

[73] Assignee: Magnetic Analysis Corporation, Mt. Vernon, N.Y.

[22] Filed: Apr. 6, 1973

[21] Appl. No.: 348,613

[52] U.S. Cl. .............................. 318/640, 250/201
[51] Int. Cl. .......................................... G01b 11/26
[58] Field of Search ............ 318/640, 676; 250/201

[56] References Cited
UNITED STATES PATENTS

| | | |
|---|---|---|
| 2,696,565 | 12/1954 | Shockley............................. 250/201 |
| 2,882,520 | 4/1959 | Hass................................. 318/640 X |
| 3,466,514 | 9/1959 | Brunner et al.................. 318/640 X |
| 3,617,751 | 11/1971 | Levy et al....................... 250/201 X |

*Primary Examiner*—Gene Z. Rubinson
*Attorney, Agent, or Firm*—Pennie & Edmonds

[57] ABSTRACT

Pairs of light sources and light responsive strips sense horizontal (H) and vertical (V) displacements of a cylindrical object from the axis of the test head in a non-destructive test apparatus prior to entering the test head. An object occludes light from the central portion of each strip and signals from the ends of each strip are amplified, detected and differentially combined to form respective servo control signals. The light sources in H and V channels are pulsated at frequencies different from each other and from the power mains, and the H and V channels are tuned thereto. The relative values of the signals in the H and V channels are initially adjusted to produce null servo control signals when an object is properly centered in the test head, and thereafter a servo system moves the position sensing and test heads to maintain centering. Signals from the individual channels are utilized to detect the ends of an object. A front end signal starts the servo control and, after a delay, starts the testing. A rear end signal discontinues servo control until the object has passed through the test head and then recenters the head for the next object.

10 Claims, 6 Drawing Figures

AUTOMATIC CENTERING OF OBJECTS IN NON-DESTRUCTIVE TEST APPARATUS

BACKGROUND OF THE INVENTION

Some types of apparatus for the non-destructive testing of generally cylindrical objects include test sensing means or heads having a desired axis for travel of such objects therethrough. Examples are eddy current and magnetic leakage flux test apparatus.

In some cases the sensitivity of the sensing means changes if the object is off-center, so that the response to defects or flaws of the same size may depend on their position around the object. Also, if the sensing head is designed to accept objects of a given diameter with only a small clearance, an off-center object may damage the head.

Even though an object is initially centered, if it is not straight it may move off-center as it passes through the sensing head with resultant adverse effects on flaw detection or damage to the head.

Objects which are intended to be truly circular in cross-section and of uniform diameter may in fact be somewhat oval or the diameter may vary. Such variations may be taken into account in selecting the nominal clearance between the object and the sensing means. In such cases there may be a variation in sensitivity around the object. However, centering may still be important in order to keep the sensitivity as uniform as possible.

In some applications testing may be required under rather adverse conditions. For example it may be required to test hot rolled rods or tubes in a rolling mill. Thus any centering apparatus should be capable of functioning reliably under the various conditions encountered in practice.

The present invention is directed to centering apparatus which is capable of maintaining a generally cylindrical object substantially centered in a sensing head as it passes therethrough, despite lack of straightness and variations in diameter, etc. expected to be encountered in practice, and is capable of functioning properly despite adverse operating conditions.

SUMMARY OF THE INVENTION

In accordance with the invention, position sensing means including pairs of light source and light responsive means are positioned near and ahead of the test sensing means and angularly oriented about the path of travel of objects to the test sensing means to sense transverse displacements of an object in mutually perpendicular directions. Mounting means is providing for moving the position and test sensing means relative to the object in said mutually perpendicular directions.

Commonly the mutually perpendicular directions will be horizontal (H) and vertical (V) directions, and these designations will be used hereinafter for convenience, it being understood that other directions are possible.

Each light source and respective light responsive means are positioned on opposite sides of the path of travel of the objects and have dimensions transverse of the path of travel such that an object occludes light from the central portion of the light responsive means and leaves outer areas thereof exposed to light on each side of the occluded area. Advantageously, respective light source means are pulsated at frequencies different from each other and from the power mains frequency and the second harmonic thereof.

Circuit means are provided for producing from each light responsive means a pair of signals varying with the light falling on respective sides of the occluded area thereof. For sensing displacements of the object in the horizontal direction, a pair of channels tuned to the frequency of the horizontal light source are provided for amplifying and detecting the pair of signals from the horizontal light responsive means. The detected signals are then differentially combined to form a horizontal servo control signal. The signals corresponding to displacements in the vertical direction are similarly processed to form a vertical servo control signal.

Means are provided for initially adjusting the relative values of the signals in each pair of channels to produce null horizontal and vertical servo control signals when an object is properly centered in the test sensing means. Advantageously the test apparatus is provided with set-up means for initially indicating when an object is centered, and the servo control signals are nulled when the set-up means indicates proper centering. Thereafter, any displacement of the object in H or V directions will result in corresponding changes in the servo control signals.

A servo system is used to drive the aforesaid mounting means, and is supplied with the servo control signals, after the initial null adjustment, so as to maintain an object centered in the test sensing head as it passes therethrough.

The signals in the H and V channels are also used to detect the ends of an object under test. In the absence of an object each half of each light sensing means will produce a larger output then in the presence of an object. At least one, and preferably all, of these individual outputs is used to produce end control signals. When the front end of an object reaches the position sensing means, the front end detect signal supplies the servo control signals to the servo system so that the object will be centered in the test sensing means. This signal is also passed through a delay circuit which produces a start test signal after the front end has been properly centered.

When the rear end of the object passes by the position sensing means the rear end detect signal removes the servo control signals from the servo system so that the position of the mounting means will remain unchanged as the rear end passes through the test sensing means. The signal may also be used to discontinue testing. The rear end detect signal is also passed through a delay circuit and used to bring the mounting means back to its initial position for a properly centered object, so as to minimize the time required for the servo to center the front end of the next object to be tested.

Other features of the invention will in part be pointed out in the following description of a detailed embodiment thereof, and in part be understood therefrom.

DESCRIPTION OF THE SPECIFIC EMBODIMENTS

Figure 1:
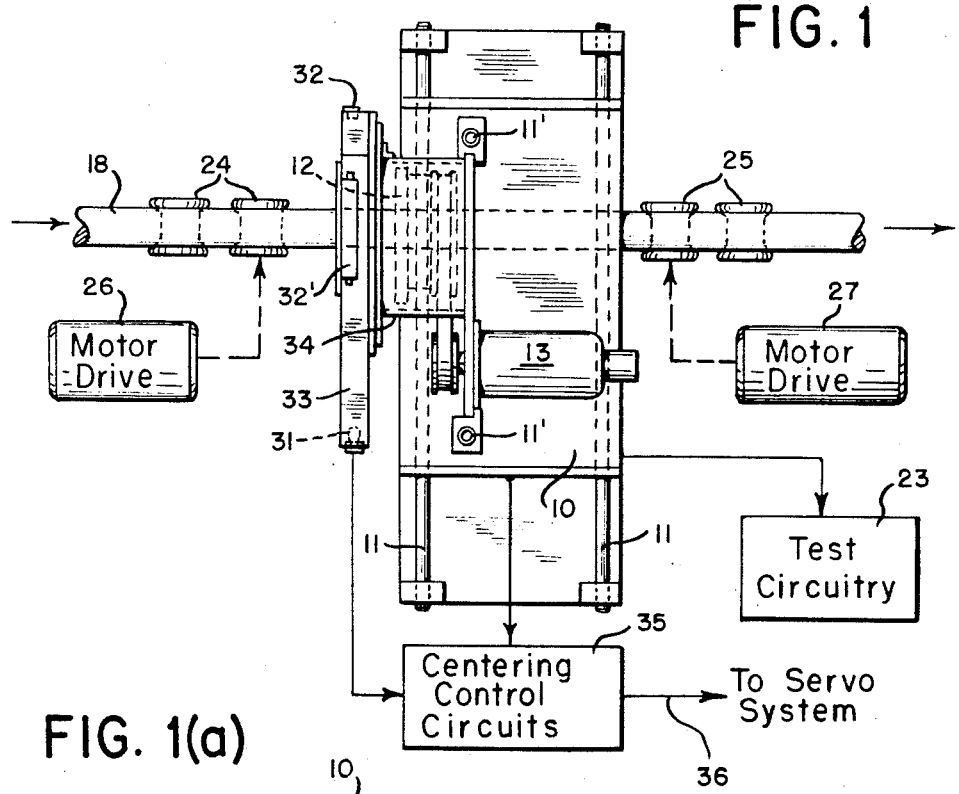
FIG. 1 illustrates a rotary eddy current test apparatus with which the invention may be employed.
Figure 1A:
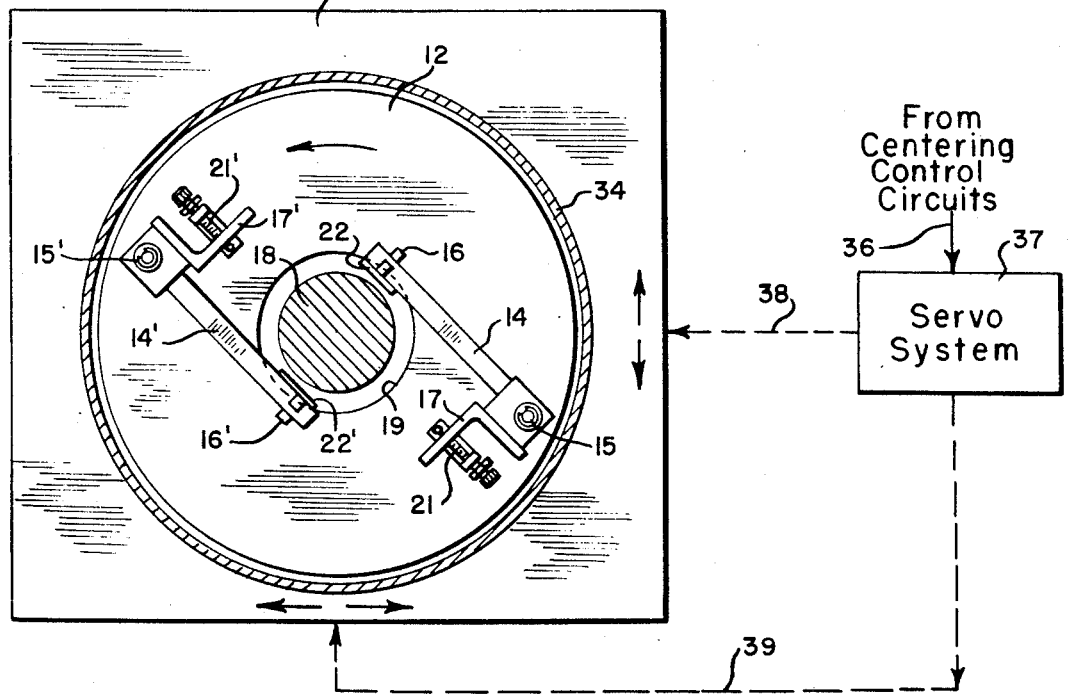
FIG. 1(a) illustrates schematically the face of the test plate and pickups.

Referring to FIGS. 1 and 1(a), a carriage 10 is mounted for horizontal movement on rods 11 and vertical movement on rods 11'. Mounted for rotation on the carriage is a face plate 12 driven by motor 13. Two pickup arms 14, 14' are pivoted on the face plate at 15, 15' and have sensing heads 16, 16' mounted at the free ends thereof. For eddy current testing, each sensing head may comprise a ferrite core with an encircling coil. Counterweights 17, 17' are attached to the arms so that when the face plate 12 is rotated, centrifugal force brings the sensing heads inward in position to test an object 18 passing through a central opening 19 in the face plate. Springs (not shown) may be used to bias the pickup arms outward when the face plate is at rest.

Adjustable stops 21, 21' are provided for limiting the inward movement of the pickup heads so that there is a small air gap between each head and the object 18. The stops may be adjusted to accommodate the nominal diameter of the object to be tested, and allow for expected variations in diameter and out-of-roundness. Shoes 22, 22' may be provided so that if the object varies excessively, it will force the pickup heads outward and avoid damage.

Rotary test apparatus as described so far is well known and the arrangement shown is simplified, and many mechanical details omitted, for convenience of presentation.

The sensitivity of a pickup head 16 to flaws in the object 18 decreases as the air gap therebetween increases, and usually the decrease is greater than linear. Thus, if the object 18 is not maintained centered, greater air gaps must be provided and overall sensitivity will be reduced. Also, when the object is off center, the sensitivity to flaws will be different for different circumferential locations of the flaws.

The pickup heads are connected to suitable test circuitry 23 to indicate defects or flaws, and one embodiment will be described hereinafter in connection with FIG. 3.

Generally cylindrical objects 18 are fed through the test apparatus on sets of rollers 24, 25, one or both sets of rollers being driven by suitable means indicated as motor drives 26, 27. Examples of such objects are hot rolled rods or tubes, cold rods or tubes, wire, etc. and the feeding mechanism may be chosen as required for the objects to be fed.

Non-contacting or air-ride pickups as described above are particularly useful in testing objects whose surfaces are rough or scaly, such as hot rolled stock. Rotary test equipment is also known in which the pickup heads ride in contact with the object to be tested. In such case the spacing remains constant, so that changes in sensitivity are avoided. However centering may still be desirable to assure that the object will enter the measuring aperture, and to avoid difficulties if the objects are not straight. Also, the end detection features may be useful with centrifugally operated pickup arms, to stop rotation in the absence of an object so that a subsequent object will not strike and break the pickup arms.

In accordance with the invention, the lateral position of an object 18 is sensed in horizontal and vertical directions by respective pairs of light source and light responsive means. FIG. 1 shows a light source 31 and a light responsive strip 32 positioned on opposite sides of the object 18 so as to sense displacements in the vertical direction. A similar light source and strip is mounted perpendicularly to 31, 32 to sense displacements in the horizontal direction, and strip 32' is shown in FIG. 1.

The light sources and light responsive strips are mounted in a suitable housing 33 which is attached to the test sensing housing 34 mounted on carriage 10. Thus both the position sensing and test sensing heads move simultaneously with respect to the path of travel of object 18 as the carriage 10 is moved. It would be possible to produce the desired relative movement by mounting the feed rollers 24, 25 on a platform and arranging for the platform to be moved in the H and V directions. However, the arrangement shown is usually more feasible.

The light responsive strips 32, 32' are connected to centering control circuits generally indicated as 35, one embodiment of which will be described in connection with FIG. 5. Also circuit elements responsive to the position of carriage 10 in H and V directions are connected to control circuits 35. Servo control signals in H and V directions are developed in 35 and supplied through connections 36 to the servo system 37 in FIG. 1(a). The servo system drives carriage 10 in vertical and horizontal directions as indicated by dash lines 38, 39 and the adjacent double headed arrows. The servo system can be electrical, hydraulic, etc. as meets the requirements of the particular application.

Figure 2:
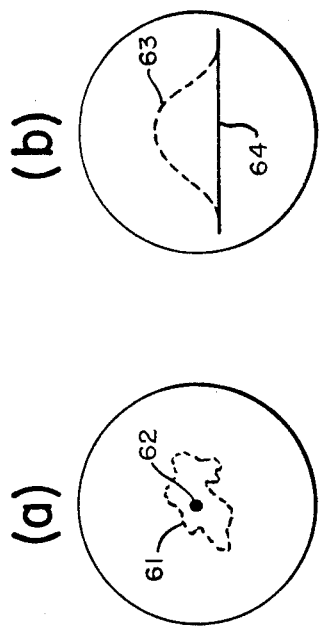
FIG. 2 illustrates a coil type eddy current test apparatus with which the invention may be employed.

Referring to FIG. 2, a coil sensing system used in another type of eddy current test apparatus is illustrated. A primary coil 41 and a pair of null-connected secondary coils 42 are mounted coaxially in a housing 43, and the housing is mounted on a carriage 10' which may be arranged similarly to FIG. 1 for movement in H and V directions. A cylindrical object 18 to be tested is fed through the coil assembly by suitable feeding means, here shown as rollers. Primary coil 41 may be driven by oscillator 44, and the output of secondary coils 42 fed to appropriate detecting and indicating circuitry as indicated at 45, in accordance with known practice. Pulse excitation may also be employed.

In the coil arrangement of FIG. 2 it is highly desirable to keep object 18 centered with respect to the axis of the coil assembly, since departures therefrom change the sensitivity for flaws on opposite sides of the object in the direction of off-centering, and excessive displacements may damage the coil structure. Accordingly a position sensing arrangement 31-33 similar to that shown in FIG. 1 is mounted on carriage 10'. Centering control circuits and a servo system are employed as in FIG. 1, but are omitted here for simplicity of illustration. Inasmuch as the coil system of FIG. 2 is commonly much lighter than the rotary system of FIG. 2, less power is required to move the carriage and less powerful servo systems may be employed.

Figure 3:
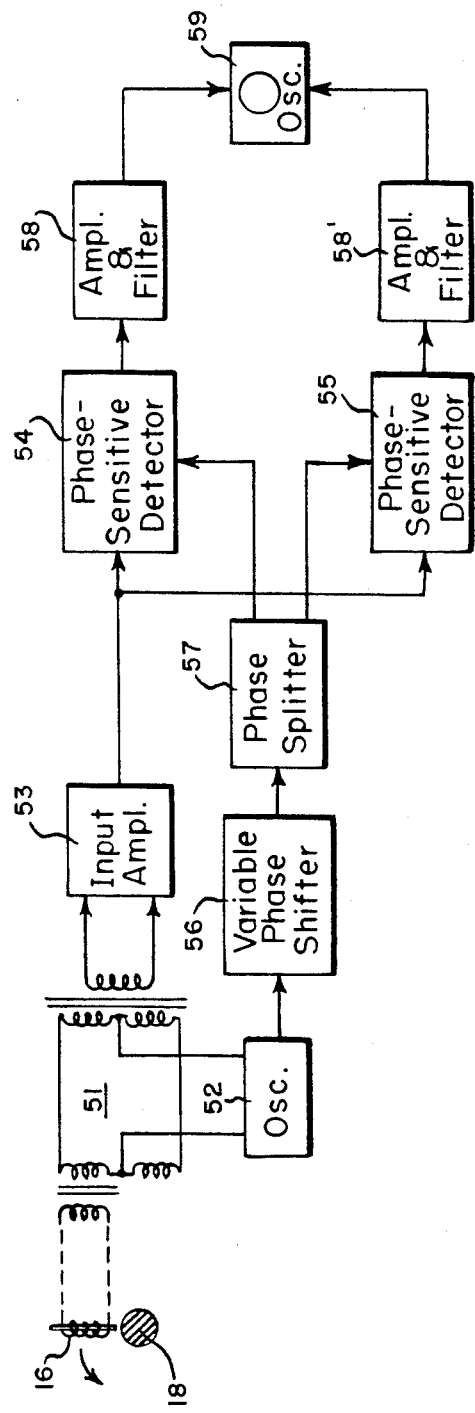
FIG. 3 is a block diagram of the circuit employed with the rotary test apparatus of FIG. 1.

FIG. 3 shows an example of known test circuitry which may be employed with the rotary pickup arrangement of FIG. 1. Depending upon the application, only one pickup may be used, or the two pickups may be connected in parallel, or each pickup may be connected to its own indicating circuitry. Here pickup head 16 is shown connected to a bridge circuit 51. Oscillator 52 is connected across one diagonal and supplies current to coil 16. Flaws in the object produce an output signal which is amplified at 53 and supplied to two phase-sensitive detectors 54, 55. The output of the oscillator is also supplied through a variable phase shifter 56 and phase splitter 57 to the phase-sensitive detectors. Thus the outputs of the detectors are quadrature related, and they are supplied through amplifier and filter circuits 58, 58' to an indicating device here shown as an oscilloscope 59.

By applying the outputs of 58, 58' to H and V deflection circuits in the oscilloscope a polar display may be obtained. The display may be rotated by adjusting phase shifter 56. It is also possible to exhibit a linear display by applying the output of only one channel to the vertical deflection circuits of the oscilloscope, and applying a synchronized linear sweep to the horizontal deflection circuits. Here also the phase of the display may be adjusted by phase shifter 56.

Either type of display may be used to indicate correct centering of an object in the rotary arrangement of FIG. 1 by inserting the object and holding it stationary while the pickups are spinning. A round, unflawed section of the object is preferable. If the object is off-center, a pattern will be observed on the polar display which covers a considerable area, such as shown at 61 in FIG. 4(a). Depending on conditions, the pattern may be quite jagged and unsymmetrical. Then the carriage 10 is moved in H and V directions until the area of the pattern is a minimum, ideally a spot as shown at 62.

Figure 4:
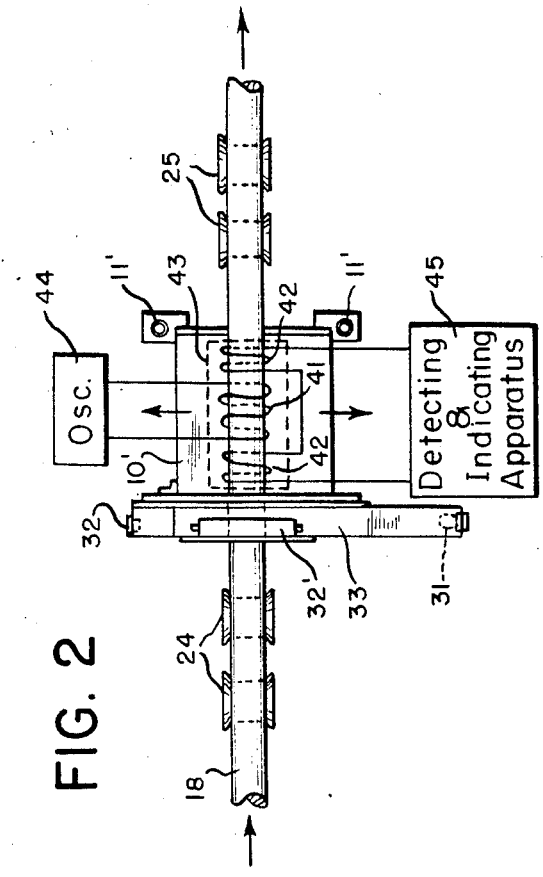
FIG. 4 illustrates polar and linear displays of the arrangement of FIG. 3 which may be used to indicate proper centering of an object.

Using a linear display, the pattern may initially deviate considerably from a straight line, such as shown at 63 in FIG. 4(b). The carriage is then moved until the pattern is as near a straight line as possible, such as shown at 64. The phase shifter 56 may then be varied and the carriage readjusted so that as near straight line displays as possible are obtained in all positions of the phase shifter.

Circuits are also known for indicating correct centering in the coil system of FIG. 2, but will not be described since the details of such circuits form no part of the present invention.

Other means for initially determining proper centering of an object in the test apparatus may be employed if desired.

Figure 5:
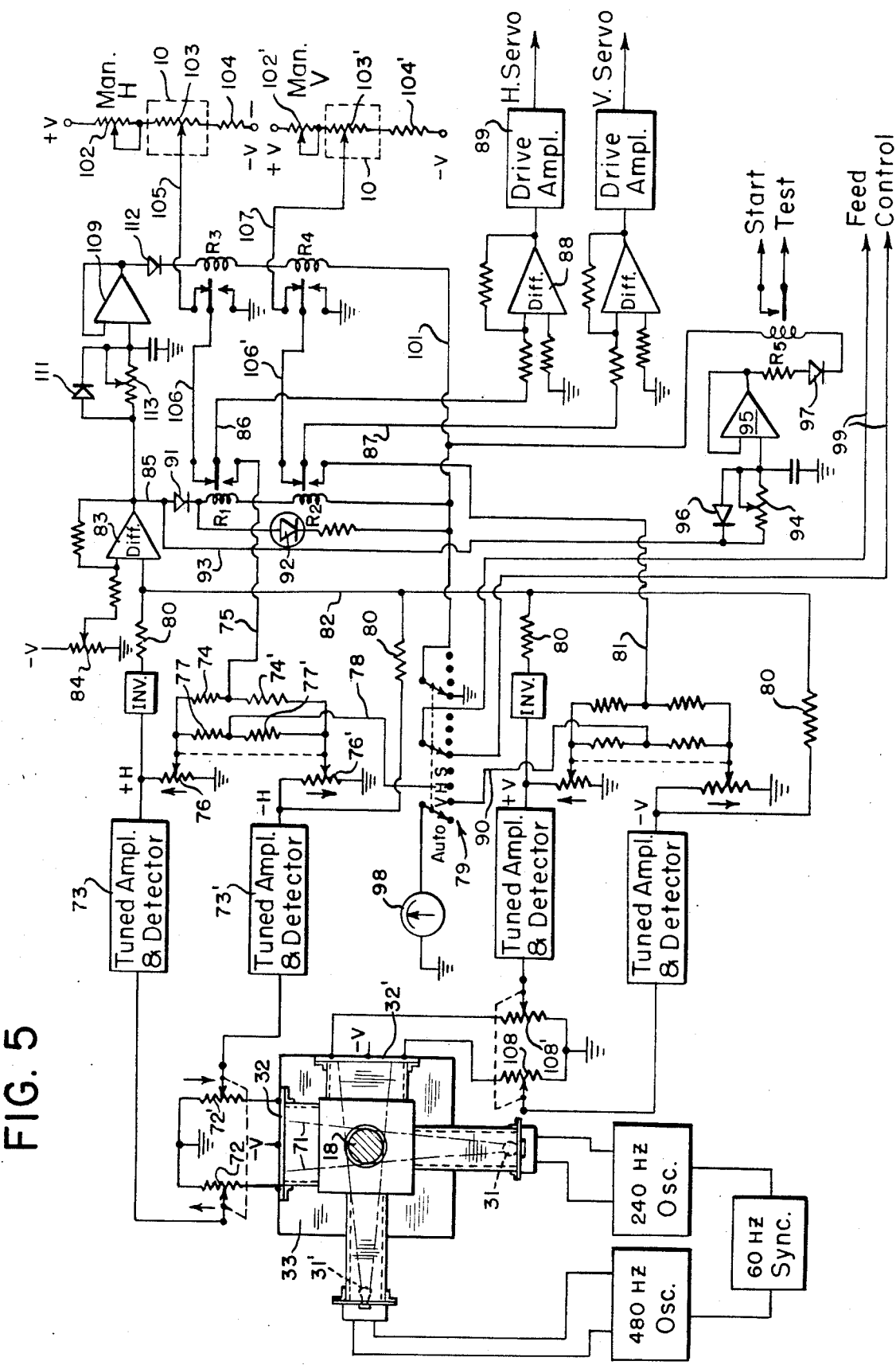
FIG. 5 is a circuit diagram of one embodiment of the centering arrangement of the invention.

Referring now to FIG. 5, an embodiment of the invention is shown which is capable of maintaining centering during testing, after initially establishing the desired centering. Light source 31 and light-sensitive strip 32 are placed on opposite sides of object 18 to sense displacement in the horizontal direction. The transverse dimensions of the source and strip are selected so that light to the central portion of the strip is occluded by the object, e.g., between lines 71, and leaves the outer ends of the strip exposed to light on each side of the occluded area.

The light sources may be small lamps, light-emitting diodes (LED), etc. and the light-sensitive strips may be of the linear Schottky barrier type, photo-diode strips, etc. In place of a single strip for sensing displacements in each direction, a pair of strips may be employed with adjacent ends connected together.

It is important to keep the light response in the H and V directions independent of each other. While housing 33 is designed to shield the light sources and strips from each other as much as possible, inasmuch, as it is desirable to sense displacements in H and V directions at the same point in the path of travel of the object, perfect shielding is difficult if not impossible. Accordingly the light sources are pulsated at different frequencies so that, by subsequent filtering, interaction between H and V channels can be avoided. Also, inasmuch as openings must be provided for the passage of objects through the position sensing region, it is difficult to shield adequately against ambient light. Artificial lighting frequently has a substantial variation at the power mains frequency and/or the second harmonic thereof. Accordingly it is desirable to pulsate the light sources at frequencies well away from the power mains frequency. In this specific embodiment 240 Hz and 480 Hz are employed, preferably synchronized to the 60 Hz power mains frequency to avoid beat frequencies, and higher frequencies may be employed depending on the characteristics of the light source.

Since the H and V channels are similar, only the H channels will be described in detail. Overall, the pair of signals from respective ends of photo-strip 32 are separately amplified and detected, the detected signals are differentially combined to form an H servo control signal, and means are provided for initially adjusting the respective values of the two signals to produce a null servo control signal when an object is properly centered in the test sensing means. Various detailed circuitry and adjustments may be employed for the purpose. Operational amplifiers of available types are employed at various points in the circuit, connected to perform the described functions.

As specifically illustrated, photo-strip 32 is of the linear Schottky barrier type and resistive loads 72, 72' are connected between the ends thereof. The center of the strip is connected to a power supply −V and the junction of 72, 72' is grounded. Thus, if the strip is symmetrical in its response to light with respect to its center, equal currents will flow in leads, 72, 72' if the area occluded by object 18 is centered with respect to the strip. Otherwise the currents will differ. Loads 72, 72' here are potentiometers, with the sliders ganged for movement in opposite directions as indicated by the arrows, so that the output signals can be adjusted as required. The two output signals are fed through respective amplifiers and detector circuits tuned to the 240 Hz frequency of the signals. The outputs are combined by a pair of equal resistors 74, 74' to yield an H servo control signal in line 75. Since differential combining is sought, the detectors in channels 73, 73' are oppositely poled to produce +H and −H outputs as indicated. To permit equalizing the gains of the two channels, ganged potentiometers 76, 76' are provided so that the ratio of the signals to the combining circuit 74, 74' can be adjusted. Equal gains can be obtained by connecting the inputs of 73, 73' together and supplying a signal thereto, and adjusting 76, 76' to give a null output in line 75. Then the inputs of 73, 73' are reconnected as shown.

For initial adjustment, a separate combining circuit composed of equal resistors 77, 77' is provided, and the output in line 78 supplied to one section of a three-section, four-position ganged switch generally designated 79. Separate combining circuits are here used to provide suitable impedances for the devices to which they are connected.

The vertical channels are similar, yielding a V servo control signal in line 81 and a test signal in line 82 connected to switch 79.

An end detect circuit is provided for control purposes, as briefly described before. The signal outputs +H and −H from 73, 73', and similar signals +V and −V from the V channels, will be greater in magnitude in the absence of an object 18, and consequently will decrease as the front end of an object enters, and increase as the rear end leaves. The +H and +V signals are inverted and supplied along with the −H and −V signals through respective resistors 80 to line 82 connected to one input of a differential operational amplifier 83. The other input is an adjustable negative voltage from potentiometer 84. If the negative input in line 82 is equal or greater than the negative voltage from 84, the output in line 85 will be zero or negative. If the negative input in line 82 is less than that from 84, the output in line 85 will be positive. By appropriately setting potentiometer 84, the output in line 85 will be positive when an object is present, and zero or negative when no object is present.

It is desirable to have a substantial difference in voltage in line 82 under the two conditions, so that the adjustment of potentiometer 84 will not be too critical. Although only one output, say −H, might be supplied to the end detector 83, the actual value of the signal in the presence of an object will vary with the position of the object in the position sensing head. If the object is sufficiently small, and markedly off-center, it is possible for the output signal corresponding to one light quadrant to be quite large, approaching that for no object. Consequently it is preferred to average the output signals corresponding to a plurality of light quadrants, so that a resultant signal is produced whose magnitude is intermediate the maximum and minimum values of the individual signals. In this embodiment all four individual output signals are combined through resistors 80, so that an averaging effect is obtained which produces a signal in line 82 which is reasonably independent of object position and assures proper detection.

When line 85 goes positive in the presence of an object, relays R1 and R2 are energized and connect H and V servo control lines 75 and 81 to respective output lines 86 and 87. In the H channel, the servo control signal is supplied to a differential amplifier 88. If the control signal is zero (null), the output of 88 will be null. If the control signal varies in either direction, the output of 88 will correspondingly vary and supply a drive signal through driver amplifier 89 to the servo system 37 (FIG. 1). The V control channel is similar.

Diode 91 prevents actuation of relays R1 and R2 when line 85 is negative. LED 92 gives a visual indication when the relays are actuated.

When the front end of an object is detected it may not be centered and sufficient time should be allowed for the servo system to center it before testing begins. Means for enabling the test apparatus may take various forms. In FIG. 1 it can be accomplished by starting motor 13. In FIG. 2 relays can be employed at an appropriate point in the detection circuits. Or, a start-stop or variable speed control can be used in the drive mechanism for feeding the objects.

In FIG. 5 a "Start Test" signal is produced at a selectable time interval after the servo system has been energized. When line 85 goes positive, the signal is supplied through line 93 to an adjustable R-C time delay circuit 94 to the input of amplifier 95. The delayed output energizes relay R5 to provide a start test signal. This signal can then be used as desired to initiate full speed testing.

When lines 85 and 93 go zero or negative at the rear end of the object, diode 96 becomes conductive and the output of amplifier 95 goes zero or negative, diode 97 becomes non-conductive and relay R5 is deenergized. This leaves a small portion of the object untested, which is satisfactory for many applications. For example the cutting of hot rolled stock into suitable lengths frequently deforms the ends so they need not be tested. Also, in the case of rotary testing as in FIG. 1, it may be desirable to stop the rotation of plate 12 and allow the pickup heads to move outward before the end passes therethrough, to avoid damage to the heads if the end is markedly deformed or bent. Under appropriate circumstances it may be desired to completely test the end, and in such case a time delay before relay R5 drops out can be introduced.

Before considering the rear end delay circuit, the initial set-up provisions will be described. The right hand position of switch 79 is for setup. In this position meter 98 is not functioning, the feed control lines 99 are disconnected, and ground is removed from line 101. The latter renders relays R1-R5 inoperative, and they are in the deenergized positions shown. Servo control lines 75, 81 are disconnected from lines 86, 87. The servo system is then adjusted manually until centering is achieved.

Manual control of the H servo position is obtained by a rheostat 102, a potentiometer 103 and a resistor 104 energized by +V and −V. Potentiometer 103 is mounted on carriage 10 in such a manner that the position of the slider varies with the carriage position. The slider is connected through line 105, the back contacts of R3, line 106 and the back contacts of R1 to line 86 which controls the H servo drive. A similar arrangement is provided for the V channel, slider line 107 being connected to line 87.

With an object in the position and test sensing heads, rheostats 102, 102' are adjusted until the object is centered in the test sensing head. Proper centering may be determined as desired. Procedures for the apparatus of FIG. 1 have been described in connection with FIGS. 4(a) and 4(b).

Switch 79 is then moved to the left to connect zero center meter 98 to line 78, and ganged potentiometers 72, 72' at the H photo-strip 32 adjusted to give a null indication. Switch 79 is then moved further left to connect the meter to line 90, and the ganged potentiometers 108, 108' at the V photo-strip adjusted to give a null indication.

The set-up object may then be removed from the heads, or moved back so that it will be the first to be tested. Switch 79 is then moved to its left hand position for automatic operation. This disconnects meter 98, connects feed control lines 99 together to energize the feed motors 26, 27 (FIG. 1), and grounds line 101 to enable relays R1-R5. As already described, as soon as the front end of an object arrives, relays R1 and R2 will be energized and connect servo control lines 75, 81 to lines 86, 87, respectively, so that the position sensing circuits will take over control of the servo system. Actuation of relays R1 and R2 disconnects the manual control signals from lines 86, 87. After a suitable delay, relay R5 is energized and testing begins.

When relays R1 and R2 are energized by line 85 going positive, amplifier 109 is driven through diode 111 to supply an energizing current through diode 112 to relays R3 and R4. This grounds corresponding lines 106, 106', but has no effect at the moment since relays R1 and R2 have disconnected these lines.

At the end of an object the output of end detector 83 goes zero or negative, deenergizing relays R1, R2 and R5. Relays R3 and R4 continue to be energized for a short interval. Thus lines 86 and 87 are grounded through lines 106, 106' and the front contacts of relays R3 and R4. This prevents the servo system from moving the carriage 10 (FIG. 1) and the carriage remains in its last adjusted position until the rear end of the object has passed through the test sensing head.

After a suitable rear end time delay as determined by the setting of the R-C delay circuit 113, the zero or negative input to amplifier 109 cuts off current to relays R3 and R4, thereupon returning them to the positions shown. This reconnects manual lines 105, 107 to servo lines 86, 87 so that the carriage moves to its initial centered position, ready for the next object.

The invention has been described in connection with a specific embodiment thereof. Although the specific applications are to eddy current test apparatus, it will be understood that it can be employed with other types of non-destructive test apparatus where centering problems exist. The specific circuitry described may be modified in accordance with the judgment of the designer. Also, certain features may be employed and others omitted as meets the requirements of a particular application.

We claim:

1. In test apparatus for the non-destructive testing of generally cylindrical objects including test sensing means having a desired axis for travel of said objects therethrough and means for feeding objects therethrough, centering apparatus for maintaining a said object centered in said test sensing means which comprises
   a. position sensing means including pairs of light source and light responsive means positioned near and ahead of said test sensing means and angularly oriented about the path of travel of a said object to sense lateral displacements thereof in mutually perpendicular directions,
   b. mounting means for moving said position and test sensing means relative to said object in said mutually perpendicular directions,
   c. each light source and respective light responsive means being positioned on opposite sides of said path of travel and having dimensions transverse of the path of travel such that said object occludes light from the central portion of the light responsive means and leaves areas thereof exposed to light on each side of the occluded area,
   d. means for pulsating said pair of light source means at respectively different frequencies,
   e. means for producing from each light responsive means a pair of signals varying with the light falling on respective sides of the occluded area thereof,
   f. respective means tuned to the frequency of said pair of signals from each light responsive means for amplifying and detecting said signals,
   g. means for differentially combining the pair of detected signals corresponding to each light responsive means to form respective servo control signals,
   h. null adjusting means for initially adjusting the relative values of the detected signals of each of said pairs to produce respective null servo control signals when an object is centered in said test sensing means,
   i. and a servo system responsive to said servo control signals for driving said mounting means to maintain an object centered in said test sensing means as it passes therethrough.

2. Apparatus according to claim 1 in which said frequencies are substantially different from the power mains frequency and the second harmonic thereof.

3. Apparatus according to claim 1 in which said null adjusting means adjusts the relative values of the signals from each of said light responsive means.

4. Apparatus according to claim 1 including
   a. means for initially disconnecting said servo control signals from said servo system,
   b. means for manually controlling said servo system to center an object in said test sensing means in said mutually perpendicular directions, respectively,
   c. means for indicating the values of said disconnected servo control signals during initial adjustment of said null adjusting means,
   d. and means for thereafter supplying said servo control signals to said servo system.

5. Apparatus according to claim 1 in which said test apparatus includes set-up means for initially indicating substantial centering of an object in said test sensing means, said centering apparatus including means for initially removing said servo control signals from said servo system, means for manually controlling said servo system until said set-up means indicates substantial centering, means for rendering said null adjusting means effective while said set-up means indicates substantial centering, and means for thereafter applying said servo control signals to said servo system.

6. Apparatus according to claim 1 including end detecting means responsive to at least one signal corresponding to the light falling on one side of the occluded area of at least one of said light responsive means for producing respective front and rear end signals indicating the entry and passage thereby of an object.

7. Apparatus according to claim 6 including delay means responsive to the initiation of a said front end signal for producing a start-test signal for said test apparatus.

8. Apparatus according to claim 6 including
   a. means for producing initial signals for said servo system corresponding to the centering of an object in said test sensing means in said mutually perpendicular directions, respectively,
   b. means responsive to the initiation of a said rear end signal for disabling control of said servo system by said servo control signals and stopping movement of said mounting means,
   c. means responsive to a said rear end signal for applying said initial signals to said servo system after a predetermined time delay and drive said mounting means to the initial centered position thereof, d. and means responsive to a succeeding front end signal for disabling control of said servo system by said initial signals and enabling control thereof by said servo control signals.

9. Apparatus according to claim 6 including means for averaging the magnitudes of a plurality of individual signals of said pairs of signals to produce a resultant signal whose magnitude is intermediate the maximum and minimum values of the individual signals, said resultant signal being applied to said end detecting means to produce said front and rear end signals.

10. Apparatus according to claim 9 including
a. means for initially disconnecting said servo control signals from said servo system,
b. means for producing initial signals for said servo system corresponding to the centering of an object in said test sensing means in said mutually perpendicular directions, respectively,
c. means for indicating the values of said disconnected servo control signals during initial adjustment of said null adjusting means,
d. means for thereafter supplying said servo control signals to said servo system,
e. means responsive to the initiation of a said rear end signal for disabling control of said servo system by said servo control signals and stopping movement of said mounting means,
f. means responsive to a said rear end signal for applying said initial signals to said servo system after a predetermined time delay and drive said mounting means to the initial centered position thereof,
g. and means responsive to a succeeding front end signal for disabling control of said servo system by said initial signals and enabling control thereof by said servo control signals.

* * * * *